United States Patent
Lee et al.

(10) Patent No.: US 9,612,441 B2
(45) Date of Patent: Apr. 4, 2017

(54) GLASS TYPE TERMINAL

(71) Applicant: LG ELECTRONICS INC., Seoul (KR)

(72) Inventors: Minjong Lee, Seoul (KR); Wonseok Joo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 17 days.

(21) Appl. No.: 14/546,986

(22) Filed: Nov. 18, 2014

(65) Prior Publication Data
US 2015/0268475 A1 Sep. 24, 2015

(30) Foreign Application Priority Data
Mar. 19, 2014 (KR) .................. 10-2014-0032398

(51) Int. Cl.
G02B 27/01 (2006.01)
G06F 1/16 (2006.01)
H04R 1/10 (2006.01)
H04R 1/02 (2006.01)

(52) U.S. Cl.
CPC ......... *G02B 27/0176* (2013.01); *G06F 1/163* (2013.01); *G06F 1/1639* (2013.01); *G06F 1/1688* (2013.01); *H04R 1/10* (2013.01); *H04R 1/1091* (2013.01); *G02B 2027/014* (2013.01); *G02B 2027/0138* (2013.01); *G02B 2027/0154* (2013.01); *G02B 2027/0178* (2013.01); *H04R 1/028* (2013.01); *H04R 2225/00* (2013.01); *H04R 2460/13* (2013.01)

(58) Field of Classification Search
CPC ........ G02B 27/0176; G02B 2027/0178; G06F 1/163; G06F 1/1639; G06F 1/1688; H04R 1/028; H04R 2460/13

USPC ............................................................ 345/8
See application file for complete search history.

(56) References Cited

U.S. PATENT DOCUMENTS 7,621,633 B1* 11/2009 Foster .................... G02C 5/146
  16/228
8,553,910 B1* 10/2013 Dong ..................... G02B 27/02
  351/158
9,241,209 B2* 1/2016 Toelle ................... H04R 1/1058
  (Continued)

FOREIGN PATENT DOCUMENTS

WO 2013/176079 11/2013

OTHER PUBLICATIONS

European Patent Office Application Serial No. 14194389.4, Search Report dated Jul. 28, 2015, 6 pages.

*Primary Examiner* — Stephen Sherman
(74) *Attorney, Agent, or Firm* — Lee, Hong, Degerman, Kang & Waimey PC

(57) ABSTRACT

Disclosed is a glasses-type terminal including a display, a controller, a power supply, and a frame. The frame includes a main frame configured to mount to a front portion of a head of a user, a first sub frame connected to a first end of the main frame and configured to be received by a first ear of the user, and a second sub frame detachably connected to a second end of the main frame and including the power supply unit, wherein the first sub frame includes the controller and wherein the power supply unit is electrically connected to the controller when the first sub frame and second sub frame are respectively connected to the first end and second end of the main frame.

18 Claims, 8 Drawing Sheets

(56) References Cited

U.S. PATENT DOCUMENTS

| | | | |
|---|---|---|---|
| 2010/0315587 A1* | 12/2010 | Leeper | G02C 5/146 351/116 |
| 2012/0314894 A1* | 12/2012 | Lund | H04R 1/028 381/334 |
| 2013/0208234 A1* | 8/2013 | Lewis | G06F 3/011 351/158 |
| 2013/0235331 A1 | 9/2013 | Heinrich et al. | |
| 2013/0324193 A1* | 12/2013 | Hosoi | H04M 1/0202 455/566 |
| 2013/0329918 A1 | 12/2013 | Kubba | |

* cited by examiner

GLASS TYPE TERMINAL

CROSS-REFERENCE TO RELATED APPLICATION

Pursuant to 35 U.S.C. §119(a), this application claims the benefit of earlier filing date and right of priority to Korean Application No. 10-2014-0032398, filed on Mar. 19, 2014, the contents of which is incorporated by reference herein in its entirety.

BACKGROUND OF THE DISCLOSURE

1. Field of the Disclosure

This specification relates to a terminal, and more particularly, a glass type terminal which is wearable on a user's head like glasses.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, the concept of the mobile terminal extends to a wearable device which can be worn on a user's body, from the conventional one which can be held by a user's hand. An example of such wearable device may be a glass type terminal.

The conventional glass type terminal may have the following problems. Firstly, an inner space of a frame is not utilized due to a small size and a light weight. As a result, right and left sides of the frame are not electrically-connected to each other, and electronic components are arranged in an unequal distribution state. Due to such unequal arrangement, a weight of the glass type terminal is distributed to one side. Further, the glass type terminal should be frequently charged due to a built-in battery.

Recently, a glass type terminal capable of transmitting a sound using a bone conduction vibration has been proposed. However, such glass type terminal is disadvantageous in that a sound quality thereof is not excellent.

SUMMARY OF THE DISCLOSURE

Therefore, an aspect of the detailed description is to provide a glass type terminal capable of solving the conventional problems, i.e., insufficient power supply, and an unbalanced distribution state of its weight resulting from that various types of electronic components are arranged in an unequal distribution state.

Another aspect of the detailed description is to provide a glass type terminal capable of providing a more enhanced sound quality.

To achieve these and other advantages and in accordance with the purpose of this specification, as embodied and broadly described herein, there is provided a glass type terminal, including: a frame unit configured to be wearable on a user's head; a display unit mounted to the frame unit, and configured to provide visual information to a user; a controller configured to control the display unit; and a power supply unit configured to supply power to the controller, wherein the frame unit includes: a main frame configured to enclose a front portion of a head; a first sub frame connected to one end of the main frame so as to be wearable on the user's one ear, and provided with the controller; and a second sub frame provided with the power supply unit, detachably-mounted to another end of the main frame, and configured to electrically-connect the power supply unit and the controller to each other when mounted.

In an embodiment of the present invention, the second sub frame may be mounted to the main frame so as to be wearable on the user's another ear.

In another embodiment of the present invention, a first connector electrically-connected to the controller may be mounted to another end of the main frame. A second connector, electrically-connected to the power supply unit and connectable to the first connector, may be mounted to the second sub frame.

The main frame may include: a first frame having a first opening at another end of the main frame, and configured to accommodate therein the first connector inserted through the first opening; and a separation prevention cap mounted to another end of the main frame so as to cover the first opening, and configured to prevent separation of the first connector from the first frame through the first opening.

At least part of the first connector may protrude from another end of the main frame, to thus be connectable to a second connector provided in the second sub frame. A protrusion, configured to fix the separation prevention cap by being inserted into a hole of the separation prevention cap when the first connector is connected to the second connector, may protrude from an inner side of the second sub frame.

The second sub frame may be configured to perform a relative rotation with respect to the main frame. If the second sub frame is tilted with respect to the main frame in a state where the protrusion has been inserted into the hole, the protrusion may be withdrawn from the hole such that the second sub frame is separable from the main frame.

A separation prevention protrusion may be formed at the first frame so as to be locked by a recess formed at the first connector, such that the first connector accommodated in the first frame is prevented from moving in a lengthwise direction.

The first frame may further include: a second opening communicated with the first opening, and extending toward one end of the main frame; and a first tapered portion inwardly inclined from an inner side surface of the second opening.

The main frame may further include a second frame mounted to the first frame to cover the second opening, and having a second tapered portion outwardly inclined in correspondence to the first tapered portion so as to be engaged with the first tapered portion.

The first frame and the second frame may be formed different materials.

The glass type terminal may further include a flexible printed circuit board electrically-connected to the first connector, and extending toward the controller by being inserted into the first frame through the second opening.

The first frame may further include a first part having the first tapered portion on an outer side of the first frame, and a second part having the flexible printed circuit board on an inner side of the first frame.

In another embodiment of the present invention, the glass type terminal may further include an audio output module configured to transmit a sound using a bone conduction vibration, the audio output module disposed such that at least part thereof protrudes via a through hole formed in the first sub frame.

The audio output module may be disposed in the through hole without contacting the first sub frame by a bridge member which elastically-supports the audio output module.

The bridge member may include: a base portion attached to the audio output module; a fixing portion coupled to an inner surface of the first sub frame; and a connecting portion configured to connect the base portion and the fixing portion to each other, and configured to elastically-support the audio output module such that a bone conduction vibration is prevented from being transmitted to the first sub frame, and such that the audio output module is adhered to a user's head.

The glass type terminal may further include a state sensing unit configured to sense a state change between a first state where at least part of the audio output module has protruded from the through hole, and a second state where the audio output module has been transformed toward inside of the first sub frame by being pressed. The controller may control the audio output module based on the state change sensed by the state sensing unit.

If the audio output module which has been in the second state is converted to the first state, the controller may stop the audio output module.

The audio output module may include a bone conduction device configured to generate a bone conduction vibration, and having a protrusion on one surface thereof; and an operator coupled to the bone conduction device as the protrusion is inserted into an accommodation recess, and adhered to a user's head so as to transmit the bone conduction vibration.

The protrusion may be screw-coupled to the accommodation recess.

The audio output module may further include an assembly member screw-coupled to the protrusion, the assembly member fixed to the operator in an accommodate state in the accommodation recess.

The assembly member may be integrally coupled to the operator by a double injection molding or an insert injection molding.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
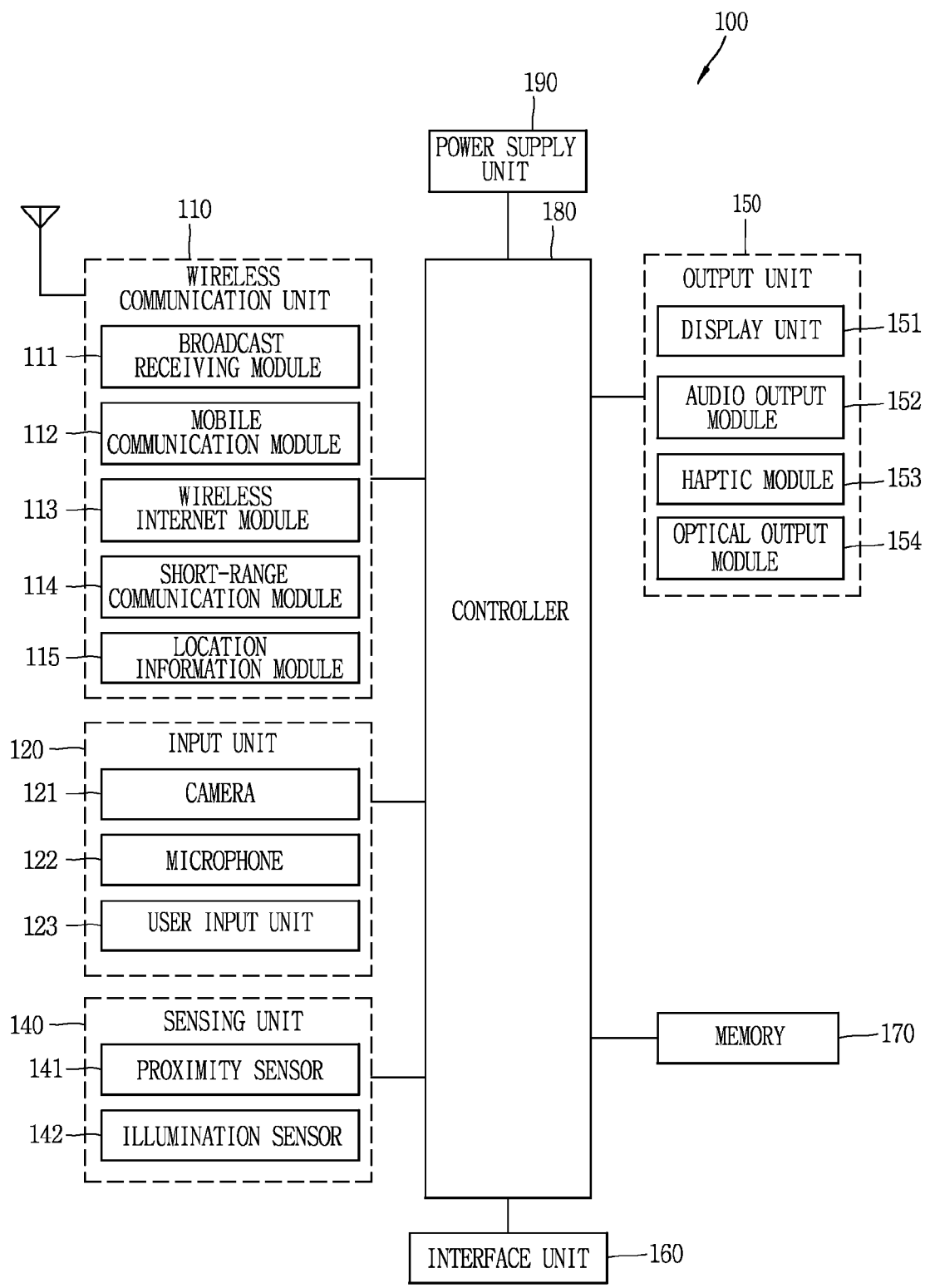
FIG. 1 is a block diagram of a glass type terminal according to an embodiment of the present invention.

FIG. 1 is a block diagram of a glass type terminal 100 according to an embodiment of the present invention.

The glass type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the wireless communication unit 110 typically includes one or more components which permit wireless communication between the glass type terminal 100 and a wireless communication system or network within which the mobile terminal is located.

The wireless communication unit 110 typically includes one or more modules which permit communications such as wireless communications between the glass type terminal 100 and a wireless communication system, communications between the glass type terminal 100 and another mobile terminal, communications between the glass type terminal 100 and an external server. Further, the wireless communication unit 110 typically includes one or more modules which connect the glass type terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glass type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the glass type terminal 100 and a user, as well as function as the user input unit 123 which provides an input interface between the glass type terminal 100 and the user.

The interface unit 160 serves as an interface with various types of external devices that can be coupled to the glass type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glass type terminal 100 may perform assorted control functions associated with a connected external device, in response to the external device being connected to the interface unit 160.

The memory 170 is typically implemented to store data to support various functions or features of the glass type terminal 100. For instance, the memory 170 may be configured to store application programs executed in the glass type terminal 100, data or instructions for operations of the glass type terminal 100, and the like. Some of these application programs may be downloaded from an external server via wireless communication. Other application programs may be installed within the glass type terminal 100 at time of manufacturing or shipping, which is typically the case for basic functions of the glass type terminal 100 (for example, receiving a call, placing a call, receiving a message, sending a message, and the like). It is common for application programs to be stored in the memory 170, installed in the glass type terminal 100, and executed by the controller 180 to perform an operation (or function) for the glass type terminal 100.

The controller 180 typically functions to control overall operation of the glass type terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the glass type terminal 100. The power supply unit 190 may include a battery, and the battery may be configured to be embedded in the terminal body, or configured to be detachable from the terminal body.

At least part of the above components may cooperate with each other, so as to control an operation of a glass type terminal according to various embodiments to be explained later. A method of controlling a glass type terminal may be implemented on the glass type terminal, by driving at least one application program stored in the memory 170.

Figure 2:
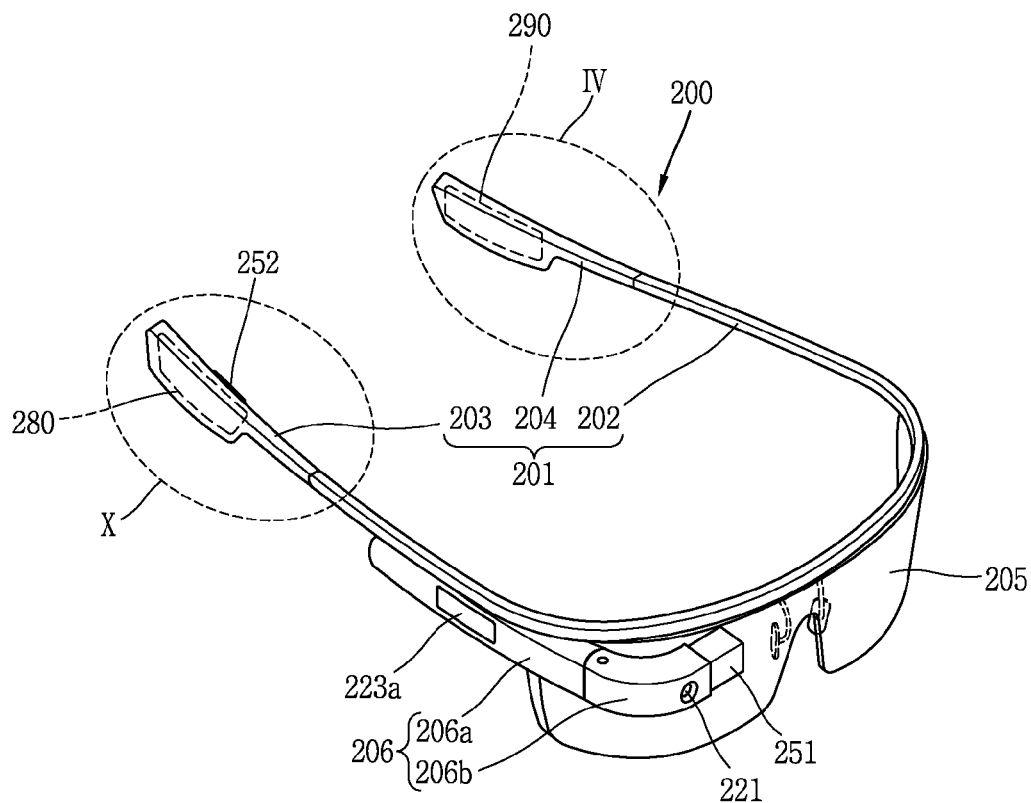
FIG. 2 is a perspective view of a glass type terminal according to an embodiment of the present invention.
Figure 3:
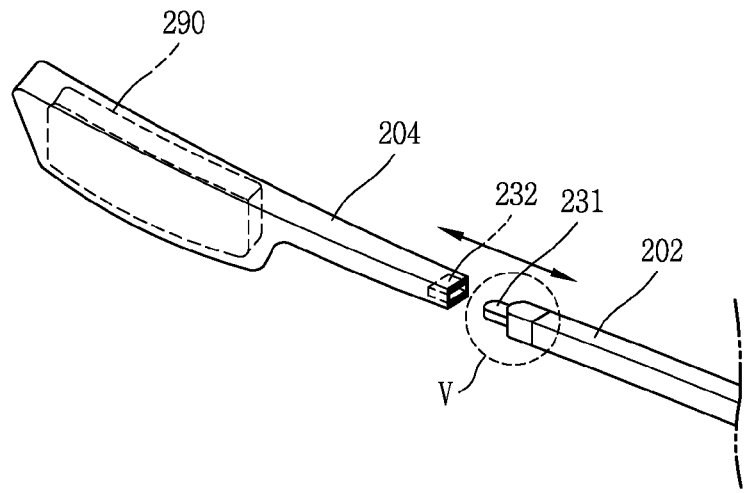
FIG. 3 is a conceptual view illustrating that a second sub frame of FIG. 2 has been separated from a main frame.

FIG. 2 is a perspective view of a glass type terminal 200 according to an embodiment of the present invention, and FIG. 3 is a conceptual view illustrating that a second sub frame 204 of FIG. 2 has been separated from a main frame 202.

Referring to FIG. 2, the glass type terminal 200 is configured to be wearable on a user's head like glasses, and is provided with a frame unit 201 (or a case, a housing, etc.).

In the drawings, the frame unit 201 has a 'U' shape when mounted to a user's head, which extends from a front portion of the head to two ears. However, the present invention is not limited to this. For instance, the frame unit 201 may have a loop shape enclosing a user's head.

The frame unit 201 may be formed of a flexible material so as to be closely adhered to a user's head. The frame unit 201 may be formed of an elastically-transformable metal, a synthetic resin, etc. As explained later, the frame unit 201 may be formed of a combination of a metallic material and a synthetic resin material.

The frame unit 201 is provided with a space where various types of components are mounted. As shown, electronic components such as a control module 280a, a controller 280, a power supply unit 290, etc. may be mounted to the frame unit 201.

A housing 206 where some electronic components are mounted may be mounted to the frame unit 201. In the drawings, the housing 206 is mounted to one side of a main frame 202 to be explained later, and a display unit 251, a camera 221 and a user input unit 233a are provided at the housing 206.

The housing 206 may include a first housing 206a and a second housing 206b. The second housing 206b provided with the display unit 251 may be configured to be rotatable with respect to the first housing 206a. Thus, a user can properly control a position of an image output in front of his or her eyes.

The display unit 251 may be implemented in the form of a Head Mounted Display (HMD). The HMD indicates a display mounted to a head and configured to display an image in front of a user's eyes. The display unit 251 may be disposed to correspond to at least one of a left eye and a right eye, such that an image is directly provided in front of a user's eyes when the user has worn the glass type terminal 200. In the drawings, the display unit 251 is arranged in correspondence to a right eye so that an image can be output toward a user's right eye.

The display unit 251 may project an image to a user's eyes using a prism. The prism may be formed to be transmissive so that a user can see not only a projected image, but also a general view (a range viewable through a user's eyes).

An image output to the display unit 251 may be overlapped with a general view. The glass type terminal 200 may provide an Augmented Reality (AR) configured to overlap a virtual image to a real image or background for a single image.

The camera 221 is disposed close to at least one of a left eye and a right eye, and is configured to capture a front image. The camera 221 can obtain a scene at which a user is looking as an image, because it is positioned close to the user's eye.

In the drawings, the camera 221 is provided at the display unit 261. However, the present invention is not limited to this. For instance, the camera 221 may be installed at the frame unit 201. Alternatively, the camera 221 may be provided in plurality so as to obtain a stereoscopic image.

The glass type terminal 200 may be provided with a user input unit 223a manipulated for input of a control command. The user input unit 223a may employ any tactile method that allows a user to perform manipulation such as touch, push, scroll or the like. In the drawings, a touch type of user input unit 223a is provided at the housing 206.

A microphone (not shown) configured to process an input sound into electric voice data, and an audio output module 252 configured to output a sound may be provided at the glass type terminal 200. The audio output module 252 may be configured to transmit a sound in a general audio output manner, or in a bone conduction manner. In a case where the audio output module 252 is configured in a bone conduction manner, when a user has worn the glass type terminal 200, the audio output module 252 is adhered to the user's head. Then the audio output module 252 transmits a sound by vibrating the user's skull.

Hereinafter, a detailed structure of the frame unit 201 will be explained with reference to the attached drawings.

The frame unit 201 includes a main frame 202, a first sub frame 203 and a second sub frame 204.

The main frame 202 is formed to enclose a front portion of a user's head. A lens 205 configured to cover at least one of a left eye and a right eye may be detachably-mounted to the main frame 202. A nose pad supported at a user's nose may be provided at the main frame 202.

The first sub frame 203 and the second sub frame 204 are provided at one end and another end of the main frame 202, respectively. The first sub frame 203 and the second sub frame 204 are wearable on a user's ears, which may be understood as temples of glasses.

The first sub frame 203 may be mounted to the main frame 202 as a separate member from the main frame 202. Alternatively, the first sub frame 203 may be integrally formed with the main frame 202. In a case where the first sub frame 203 is configured as a separate member from the main frame 202, the first sub frame 203 may be detachably-mounted to the main frame 202.

The first sub frame 203 may be provided with the controller 280 and the audio output module 252 (bone conduction type). As explained later, when a user has worn the glass type terminal 200, the audio output module 252 may transmit a sound in a bone conduction manner in an adhered state to the user's head.

The second sub frame 204 is provided with the power supply unit 290, and is detachably-mounted to the main frame 202. Upon the mounting, the power supply unit 290 of the second sub frame 204 is electrically-connected to the controller 280 of the first sub frame 203, thereby supplying power.

Here, the first sub frame 203 and second sub frame 204 are interchangeable such that the first sub frame 203 and second sub frame 204 are respectively detachably connected to the opposite end of the main frame 202.

Under such configuration, in a case where power of the power supply unit 290 is deficient, the second sub frame 204 is replaced by another second sub frame 204 provided with another power supply unit 290 equipped with a sufficient power. Accordingly, the mobile terminal 200 may be provided with sufficient power.

The conventional glass type terminal 200 has an unequal distribution of weight, resulting from that electronic components are arranged at one side. In this embodiment, the housing 206 provided with some electronic components is mounted to one side of the main frame 202. And the controller 280 and the audio output module 252 are provided at the first sub frame 203 corresponding to the one side. In order to prevent an unequal distribution of weight which may occur under such structure, the power supply unit 290 is provided at the second sub frame 204 facing the first sub frame 203. Thus, in this embodiment, a weight of the glass type terminal 200 can be equally distributed to the left side and the right side.

Hereinafter, a coupling structure and an electric connection structure between the main frame 202 and the second sub frame 204 will be explained in more detail.

The structures to be explained later may also be applied to a coupling structure and an electric connection structure between the main frame 202 and the first sub frame 203 in the same or similar manner.

Figure 4:
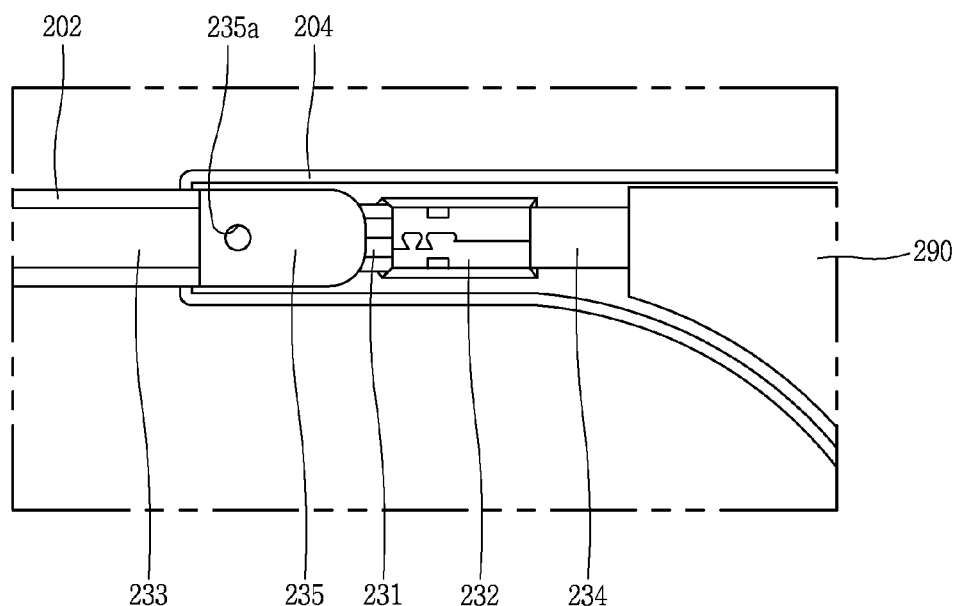
FIG. 4 is a sectional view of part 'IV' in FIG. 2.
Figure 5:
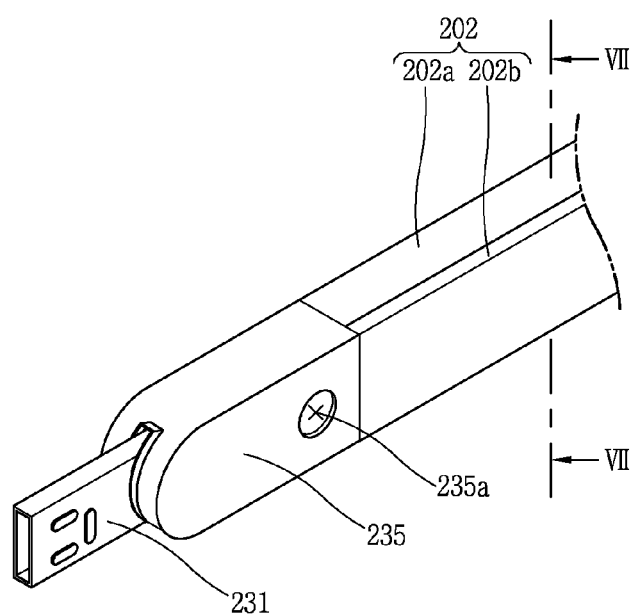
FIG. 5 is an enlargement view of part 'V' in FIG. 3, which was seen from other direction.

FIG. 4 is a sectional view of part 'IV' in FIG. 2. FIG. 5 is an enlargement view of part 'V' in FIG. 3, which was seen from other direction. And FIG. 6 is an exploded perspective view of an end portion of the main frame 202 shown in FIG. 5.

Figure 6:
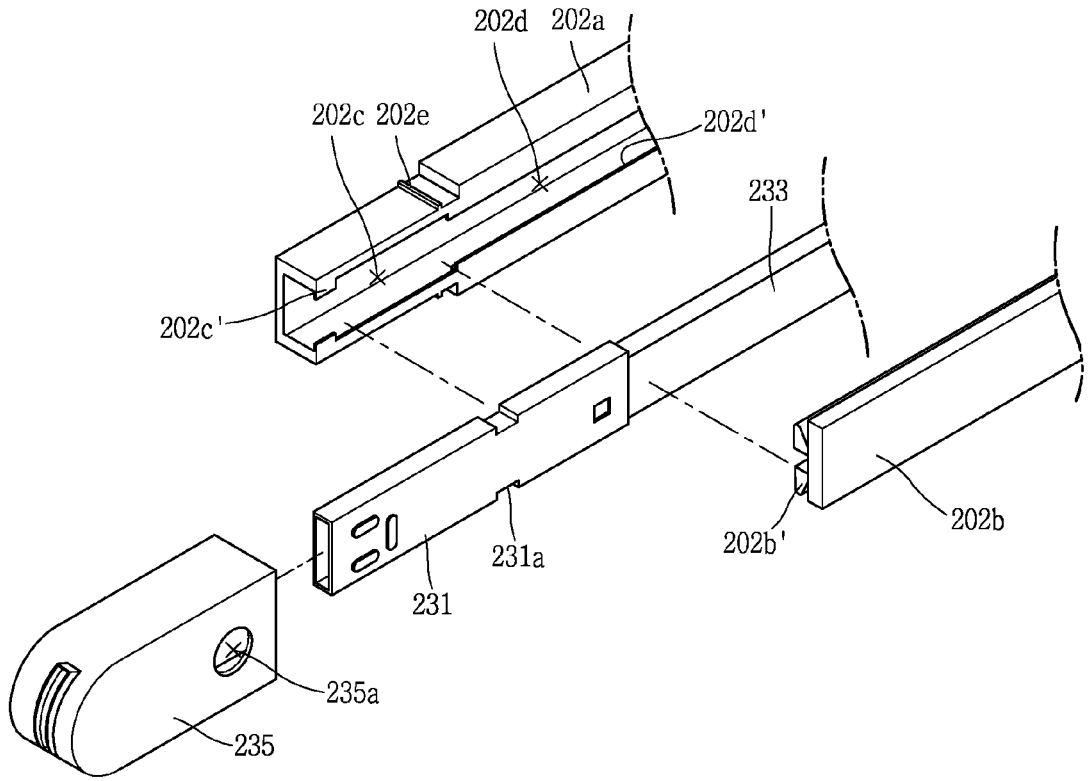
FIG. 6 is an exploded perspective view of an end portion of a main frame shown in FIG. 5.

Referring to FIGS. 4 to 6, a first connector 231 is provided at an end portion of the main frame 202 coupled to the second sub frame 204. As explained later, the first connector 231 is electrically-connected to the controller 280 of the first sub frame 203, through a flexible printed circuit board 233.

A second connector 232 connectable to the first connector 231 is mounted to the second sub frame 204. The second connector 232 may be electrically-connected to the power supply unit 290 through the flexible printed circuit board 233.

Each of the first connector 231 and the second connector 232 may include a terminal, and a housing for accommodating the terminal therein. As an example, once the housing of the first connector 231 is coupled to the housing of the second connector 232, the terminals provided in the housings come in contact with each other for electrical connection.

The main frame 202 may be implemented as a plurality of members. For instance, the main frame 202 may include a first frame 202a and a second frame 202b as shown.

A first opening 202c is formed at an end portion of the first frame 202a facing the second sub frame 204. In the drawings, the first opening 202c is formed at the end of the first frame 202a toward inside of the first frame 202a. One part of the first connector 231 is accommodated in the first frame 202a through the first opening 202c, and another part thereof protrudes from the first frame 202a.

A recess 231a may be formed at the first connector 231, and a separation prevention protrusion 202c' may protrude from the first frame 202a in correspondence to the recess 231a. Under such structure, when the first connector 231 is inserted into the first frame 202a through the first opening 202c, the separation prevention protrusion 202' is inserted into the recess 231a so that the first connector 231 accommodated in the first frame 202a can be prevented from moving in a lengthwise direction.

A separation prevention cap 235, which covers the first opening 202c so as to prevent separation of the first connector 231 having been inserted into the first frame 202a through the first opening 202c, is mounted to the first frame 202a. A fixing recess (not shown) may be formed in the separation prevention cap 235 in correspondence to a fixing protrusion 202e of the first frame 202a, such that the separation prevention cap 235 is stably fixed to the first frame 202a.

One of the first connector 231 and the second connector 232 may be inserted into another thereof. Upon the insertion, the main frame 202 and the second sub frame 204 may be coupled to each other. For an enhanced coupling force, a coupling structure using a hook may be further provided between the main frame 202 and the second sub frame 204.

A structure, which electrically-connects the power supply unit 290 of the second sub frame 204 to the controller 280 of the first sub frame 203 when the first connector 231 and the second connector 232 are connected to each other, is provided at the main frame 202. Hereinafter, such structure will be explained in more detail.

Figure 7:
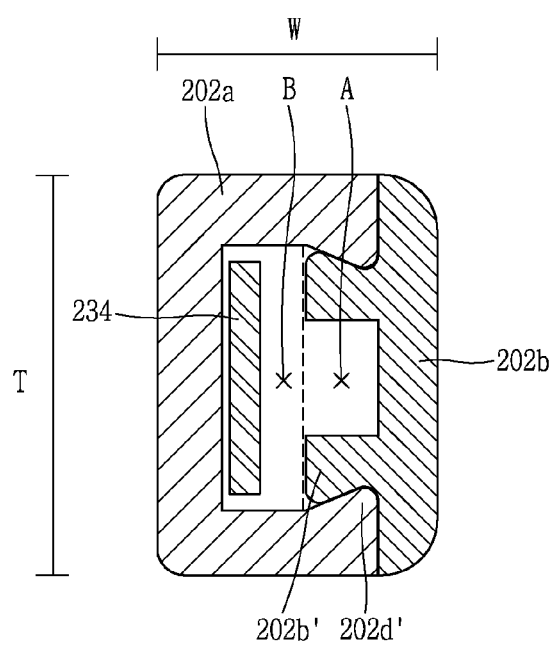
FIG. 7 is a sectional view taken along line VII-VII' in FIG. 5.

FIG. 7 is a sectional view taken along line VII-VII' in FIG. 5.

Referring to FIG. 7 with FIG. 6, the main frame 202 may be provided with a first frame 202a and a second frame 202b. The flexible printed circuit board 233 may be disposed at an inner space formed by coupling between the first frame 202a and the second frame 202b. The flexible printed circuit board 233 is electrically-connected to the first connector 231 of the main frame 202, and the controller 280 of the first sub frame 203, respectively.

More specifically, a second opening 202d communicated with the first opening 202c is provided at the first frame 202a. Under such structure, when the first connector 231 is inserted into the main frame 202 through the first opening 202c, the flexible printed circuit board 233 connected to the first connector 231 may be inserted into the main frame 202 through the second opening 202d.

The second opening 202d extends toward an end portion of the main frame 202 facing the first sub frame 203. That is, the main frame 202 not only serves to allow the glass type terminal 200 to be wearable to a user's head, but also serves to accommodate the flexible printed circuit board (FPCB) 233 therein, the FPCB configured to connect the first connector 231 and the controller 280 to each other.

Under such structure, electronic components provided at the first sub frame 203 are connectable to electronic components provided at the second sub frame 204. Furthermore, the glass type terminal 200 can have a more simple appearance, because the flexible printed circuit board 233 is not exposed to outside.

The second frame 202b is mounted to the first frame 202a so as to cover the second opening 202d. For a structural coupling between the first frame 202a and the second frame 202b, a first tapered portion 202d' and a second tapered portion 202b' configured to be engaged with each other may be formed at the first frame 202a and the second frame 202b, respectively.

More specifically, as shown in FIG. 7, the first tapered portion 202d' may be formed on facing inner side surfaces of the second opening 202d, in an inwardly inclined manner. The second tapered portion 202b' may be formed at the second frame 202b, in an outwardly inclined manner so as to be engaged with the first tapered portion 202d'.

Under such structure, when the second frame 202b is coupled to the first frame 202a, the second tapered portion 202b' is inserted into the second opening 202d in an elastically-transformed state. Then the second tapered portion 202b' is restored to the original state to thus be locked by the first tapered portion 202d'.

As shown, the first frame 202a may be divided into a first part (A) and a second part (B). The first part (A) is adjacent to the second opening 202d and corresponds to an outer side, whereas the second part (B) corresponds to an inner side. At the first part (A), the first tapered portion 202d' is formed, and the second tapered portion 202b' is accommodated when the second frame 202b is mounted to the first frame 202a. At the second part (B), the flexible printed circuit board 233 is disposed. The flexible printed circuit board 233 may be attached to an inner side wall of the first frame 202a, the inner side wall facing the second opening 202d.

In a widthwise direction (W) of the main frame 202, the first part (A) where a coupling structure between the first frame 202a and the second frame 202b is provided is separately formed from the second part (B) where the flexible printed circuit board 233 is provided. Thus, a lateral thickness (T) of the main frame 202 can be minimized. From a design perspective, the main frame 202 can seem to be thin when viewed from outside, due to the minimized lateral thickness (T) of the main frame 202.

The first frame 202a and the second frame 202b may be formed of different materials. For instance, the first frame 202a may be formed of a metallic material (e.g., stainless steel, aluminum, magnesium, etc.), and the second frame 202b may be formed of a synthetic resin material.

In a case where the first frame 202a is formed of a metallic material, the first frame 202a may be configured such that at least part thereof is electrically-connected to a feeding portion (not shown) for transception (transmission/reception) of radio electromagnetic waves. That is, at least part of the first frame 202a may be used as an antenna.

The second frame 202b formed of a synthetic resin material may be disposed to face a user's head. Thus, the first frame 202 formed of a metallic material may be reduced from directly contacting a user's skin. In a case where at least part of the first frame 202a serves as an antenna, the first connector 231 formed of a metallic material and the flexible printed circuit board 233 may shield radio electromagnetic waves. Radio electromagnetic waves may radiate in a direction far from a user's head.

In the aforementioned embodiment, the main frame 202 and the second sub frame 204 are coupled to each other, as one of the first connector 231 and the second connector 232 is accommodated in another thereof. Hereinafter, a modification example of a coupling structure between the main frame 202 and the second sub frame 204 will be explained.

Figure 8:
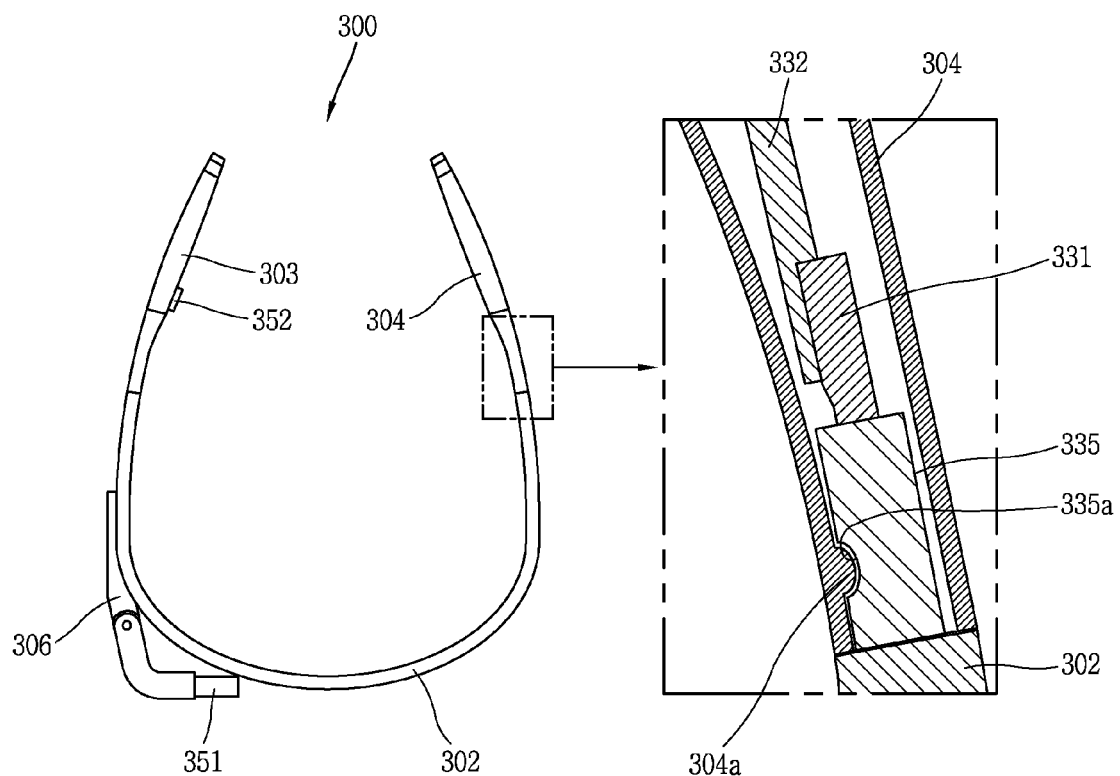
FIG. 8 is a conceptual view illustrating a modification example of a coupling structure between a main frame and a second sub frame.
Figure 9:
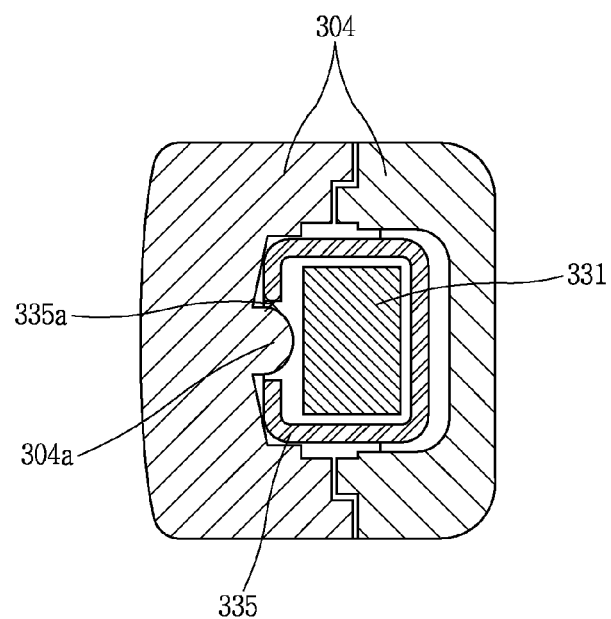
FIG. 9 is a sectional view taken along line 'IX-IX' in FIG. 8.

FIG. 8 is a conceptual view illustrating a modification example of a coupling structure between a main frame 302 and a second sub frame 304, and FIG. 9 is a sectional view taken along line 'IX-IX' in FIG. 8.

Referring to FIGS. 8 and 9, a first connector 331 is configured such that at least part thereof protrudes from a main frame 302 to thus be contactable to a second connector 332 provided in a second sub frame 304. A separation prevention cap 335 may be inserted into the second sub frame 304.

For coupling between the main frame 302 and the second sub frame 304, a protrusion 304a may be formed at the second sub frame 304. A hole 335a, configured to accommodate the protrusion 304a therein when the separation prevention cap 335 is inserted into second sub frame 304, may be formed at the separation prevention cap 335. That is, upon connection between the first connector 331 and the second connector 332, the protrusion 304a is inserted into the hole 335a to thus fix the separation prevention cap 335.

For insertion/withdrawal of the protrusion 304 into/from the hole 335a, it is preferable that the second sub frame 304 is configured to be rotatable (or tilted) with respect to the main frame 302 within a range of a predetermined angle.

More specifically, once the first connector 331 is inserted into the second sub frame 304 so as to be connected to the second connector 332, the separation prevention cap 335 slides on the protrusion 304a. In this case, the second sub frame 304 is in a rotated state with respect to the main frame 302 by a predetermined angle.

Upon connection between the first connector 331 and the second connector 332, the protrusion 304a is inserted into the hole 335a, thereby fixing the main frame 302 with respect to the second sub frame 304. Thus, even if a force is applied to the first connector 331 in a direction to withdraw the first connector 331 from the second connector 332, the main frame 302 and the second sub frame 304 are not separated from each other.

If the second sub frame 304 is rotated with respect to the main frame 302 in a state where the protrusion 304a has been inserted into the hole 335a, the protrusion 304a is withdrawn from the hole 335a. Thus the second sub frame 304 is in a separable state from the main frame 302. The main frame 302 may perform a relative rotation with respect to the second sub frame 304, centering around a contact part between the first connector 331 and the second connector 332. In order to separate the main frame 302 and the second sub frame 304 from each other, a relative rotation should be required. Thus, a coupling force can be enhanced in such structure.

Such structure may be more advantageous in a case where the first connector 331 and the second connector 332 are not provided with a coupling structure, because the main frame 302 and the second sub frame 304 should perform a relative rotation with respect to each other. FIGS. 8 and 9 illustrate a structure where the first connector 331 and the second connector 332 are electrically-connected to each other by plane-contacting each other.

In the aforementioned embodiment, if the first connector 231 and the second connector 232 are configured to perform a relative rotation with respect to each other within a range of a predetermined angle, such structure may be additionally provided for an enhanced coupling force between the main frame 202 and the second sub frame 204 (refer to the hole 235a of FIG. 5).

The glass type terminal 200 may be provided with the audio output module 252 configured to transmit a sound using a bond conduction vibration. Hereinafter, a structure of the audio output module 252 for enhancing a sound quality will be explained in more detail.

Figure 10:
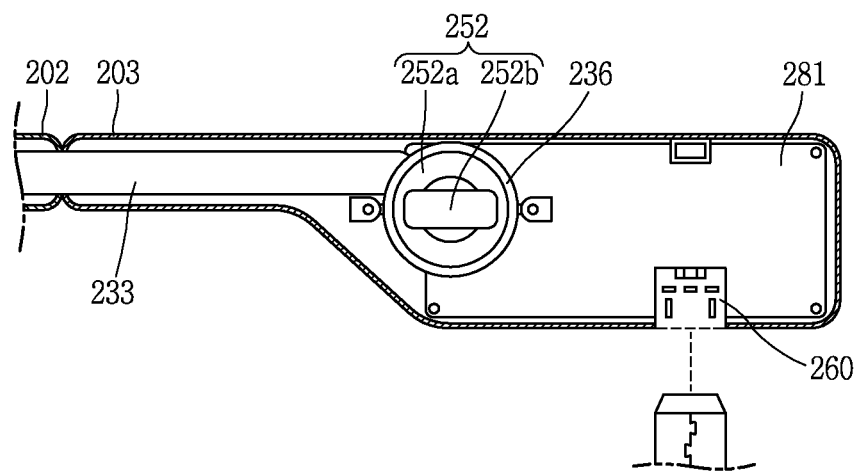
FIG. 10 is a sectional view of part 'X' in FIG. 2.

FIG. 10 is a sectional view of part 'X' in FIG. 2.

Referring to FIG. 10, a printed circuit board 281 is disposed in the second sub frame 204. The printed circuit board 281 is electrically-connected to the flexible printed circuit board 233 formed in the main frame 202 in a lengthwise direction. The printed circuit board 281 may be implemented as an example of the controller 280 for performing various types of functions of the glass type terminal 200. Various types of electronic components may be mounted on at least one surface of the printed circuit board 281. In the drawings, an interface unit 260 has been mounted to the printed circuit board 281.

The audio output module 252 is electrically-connected to the printed circuit board 281. When a user wears the glass type terminal 200, the audio output module 252 is configured to transmit a sound by vibrating the user's skull, in an adhered state to the user's head. Hereinafter, a detailed structure of the audio output module 252 will be explained.

Figure 11:
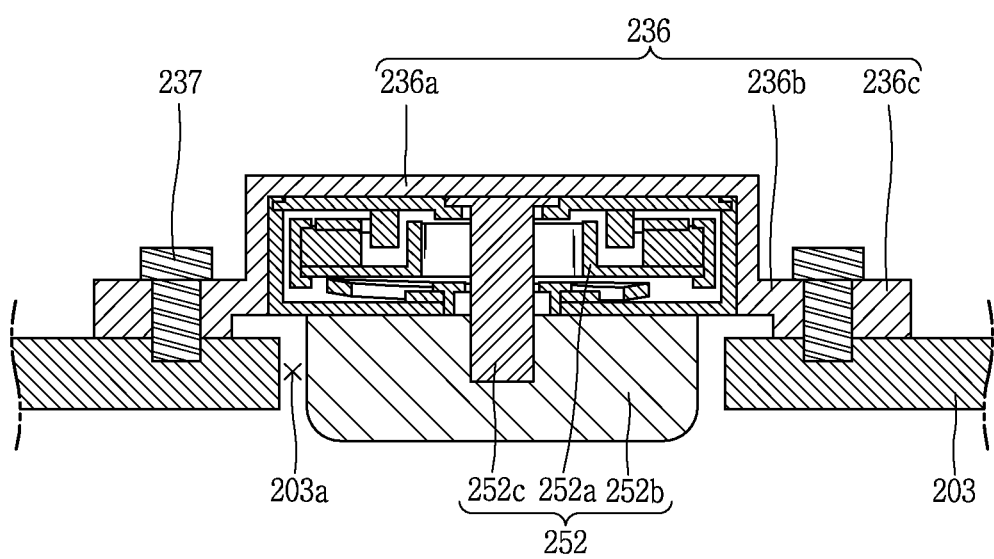
FIG. 11 is a sectional view illustrating an installation structure of an audio output module shown in FIG. 10.

FIG. 11 is a sectional view illustrating an installation structure of the audio output module 252 shown in FIG. 10.

Referring to FIG. 11, the audio output module 252 is configured to transmit a sound using a bone conduction vibration, and is disposed such that at least part thereof is exposed to outside via a through hole 203a formed in the first sub frame 203.

The audio output module 252 may include a bone conduction device (252a, (e.g., vibration transducer) configured to generate a bone conduction vibration, and an operator 252b adhered to a user's head and configured to transmit the bone conduction vibration. The bone conduction device 252a may be configured to have a shape of a cylinder provided with a hollow portion. Under such configuration, an audio function can be enhanced and a fabrication error can be reduced.

A coupling member 252c may be inserted into the hollow portion of the bone conduction device 252a, to thus be coupled to the operator 252b. By such coupling of the coupling member 252c, a bone conduction vibration of the bone conduction device 252a can be precisely transmitted to the operator 252b without a loss.

The operator 252b may be disposed in the through hole 203a without contacting the first sub frame 203, by a bridge member 236 which elastically-supports the audio output module 252. The bridge member 236 may be formed of an elastically-transformable material, e.g., silicone, rubber, etc.

A detailed structure of the bridge member 236 will be explained. The bridge member 236 includes a base portion 236a, a fixing portion 236b and a connecting portion 236c. The base portion 236a, the fixing portion 236b and the connecting portion 236c may be integrally formed with each other.

The base portion 236a may be attached to the audio output module 252, and may be configured to accommodate therein the bone conduction device 252a as shown.

The fixing portion 236b is coupled to an inner surface of the first sub frame 203. In the drawings, it is illustrated that the fixing portion 236b has been fixed to an inner surface of the first sub frame 203 by a coupling member 237.

The connecting portion 236c is configured to connect the base portion 236a and the fixing portion 236b to each other. The connecting portion 236c is also configured to elastically-support the audio output module 252 such that a bone conduction vibration is prevented from being transmitted to the first sub frame 203, and such that the audio output module 252 is adhered to a user's head.

Under such structure, a disposed state of the operator 252b in the through hole 203a, without contacting the first sub frame 203, can be maintained by the bridge member 236 which elastically-supports the audio output module 252.

Further, a bone conduction vibration generated from the audio output module 252 can be directly transmitted to a user's head. In this case, the bone conduction vibration is reduced from being attenuated by the connecting portion 236c and then being transmitted to the first sub frame 203. Thus, a sound quality can be enhanced.

Since the bridge member 236 is configured to elastically-support the audio output module 252, the audio output module 252 can be adhered to a user's head having an own shape.

Figure 12A:
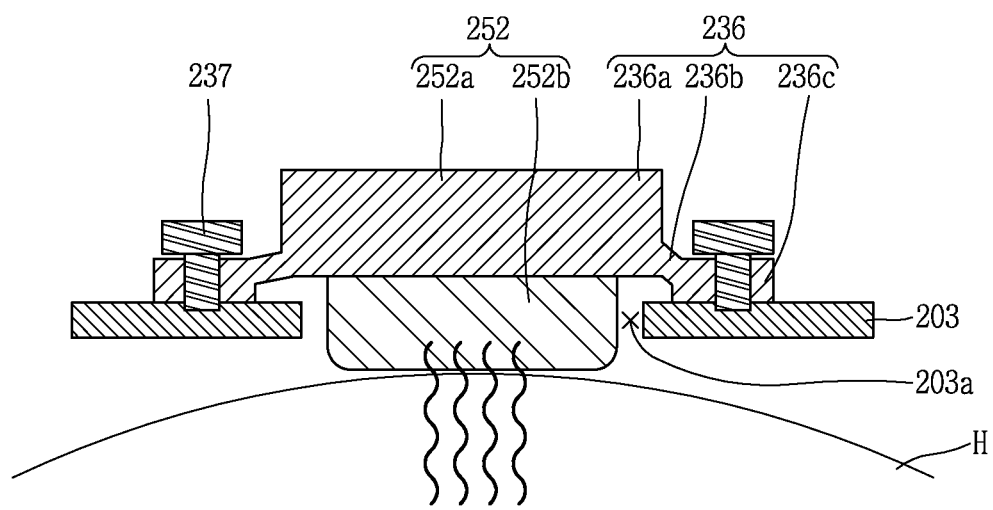
FIGS. 12A and 12B are conceptual views illustrating an example to control the audio output module 252 of FIG. 11 based on a state change sensed by a state sensing unit.
Figure 12B:
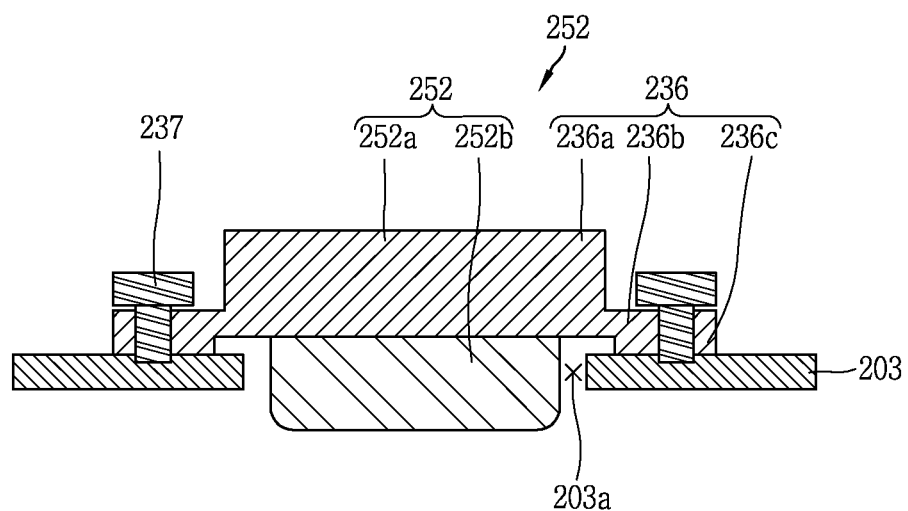

FIGS. 12A and 12B are conceptual views illustrating an example to control the audio output module 252 of FIG. 11 based on a state change sensed by a state sensing unit.

As aforementioned, the audio output module 252 is disposed such that at least part thereof is exposed to outside via the through hole 203a (first state). In the first state, if a user wears the glass type terminal 200, the audio output module 252 is pressed by the user's head (H) to be transformed into the first sub frame 203 (second state). In the second state, if the user takes off the glass type terminal 200, the audio output module 252 is restored to the original position (first state) by the bridge member 236 (especially, the connecting portion 236c which elastically-supports the audio output module 252).

FIG. 12A illustrates the second state where at least part of the audio output module 252 is pressed by a user's head to be transformed into the first sub frame 203. On the other hand, FIG. 12B illustrates the first state where at least part of the audio output module 252 has protruded from the through hole 203a. That is, the first state and the second state are directly related to whether a user has worn the glass type terminal 200 or not, because they are determined according to whether the audio output module 252 has been pressed by a user's head.

The glass type terminal 200 is provided with a state sensing unit (not shown) configured to sense a state change between the first state and the second state. The state sensing unit may be configured as an example of a sensing unit 140. The controller 280 controls the audio output module 252 based on a state change sensed by the state sensing unit.

For instance, if the audio output module 252 which has been in the second state is converted into the first state, the controller 280 may stop the audio output module 252. In this case, a user's additional operation to stop the audio output module 252 is not required. Thus, a user's convenience can be enhanced.

On the other hand, if a user wears the glass type terminal 200 in the first state, the controller 280 may operate the audio output module 252 by sensing the worn state of the glass type terminal 200. For instance, if a user wears the glass type terminal 200, the audio output module 252 may generate a bone conduction vibration corresponding to a voice requesting a user of a voice command.

Hereinafter, modification examples of the audio output module 252 will be explained.

Figure 13:
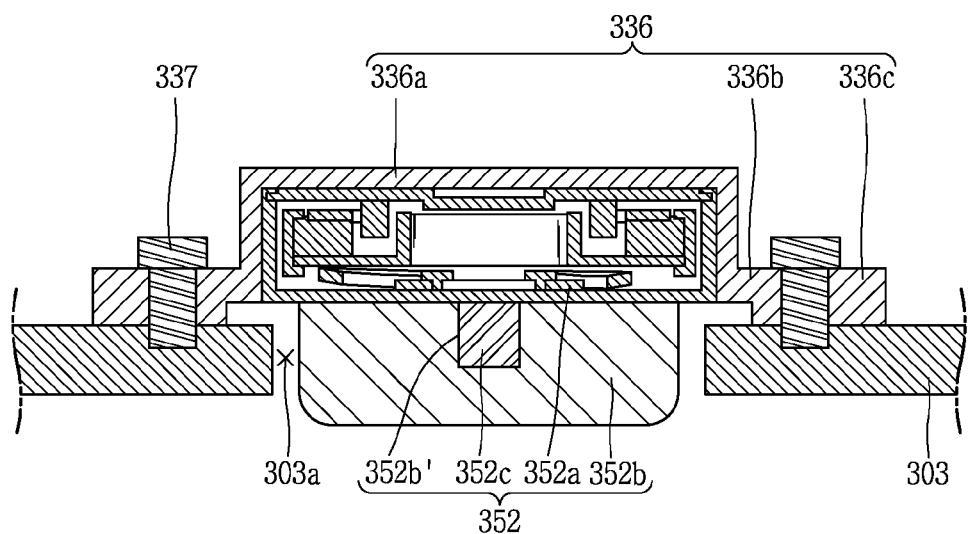
FIGS. 13 and 14 are conceptual views illustrating a modification example of the audio output module shown in FIG. 10.

Referring to FIG. 13, the audio output module 352 may include a bone conduction device 352a and an operator 352b. The bone conduction device 352a is configured to generate a bone conduction vibration. And the operator 352b is coupled to the bone conduction device 352a, and is adhered to a user's head so as to transmit the bone conduction vibration.

A coupling structure between the bone conduction device 352a and the operator 352b will be explained in more detail. A protrusion 352c is provided on one surface of the bone conduction device 352a. That is, the protrusion 352c is fixed to one surface of the bone conduction device 352a by assembly, welding, bonding, riveting, etc., without penetrating the bone conduction device 352a. An accommodation recess 352b', inwardly recessed so as to accommodate the protrusion 352c therein, is provided on one surface of the operator 352b facing the protrusion 352c.

A screw thread may be formed on an outer circumferential surface of the protrusion 352c, and a thread groove corresponding to the screw thread may be formed on an inner circumferential surface of the accommodation recess 352b'. That is, the protrusion 352c may be screw-coupled to the accommodation recess 352b', thereby coupling the bone conduction device 352a and the operator 352b to each other.

However, the present invention is not limited to this. The protrusion 352c may be coupled to the accommodation recess 352b' in a tight fit manner, or by a hook or an adhesive.

Figure 14:
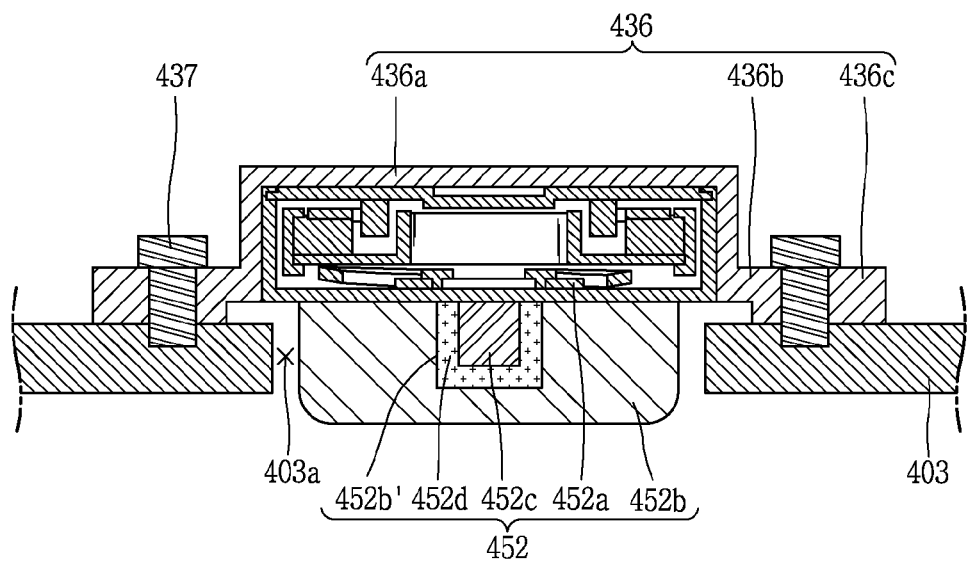

As another modification example, referring to FIG. 14, an assembly member 452d screw-coupled to a protrusion 452c may be accommodated in an accommodation recess 452b'. That is, the assembly member 452d is screw-coupled to the protrusion 452c, and is fixed to the accommodation recess 452b', thereby facilitating assembly of the protrusion 452c to an operator 452b.

The assembly member 452d may be integrally coupled to the operator 452b by a double injection molding or an insert injection molding. The assembly member 452d may be formed of a synthetic resin material or a metallic material. Alternatively, the assembly member 452d may be formed of an elastic material (silicon, rubber, etc.) in order to prevent occurrence of noise due to a mechanical friction with the protrusion 452c when a bone conduction vibration occurs.

Under the aforementioned structure, an assembly between the bone conduction devices 352a and 452a and the operators 352b and 452b can be completed merely by inserting the protrusions 352c and 452c into the accommodation recesses 352b' and 452b' and then by rotating the operators 352b and 452b, without inserting coupling members into the bone conduction devices 352a and 452a. Thus, an assembly structure can be simplified and an assembly process can be facilitated.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A glasses-type terminal, comprising:
a display;
a controller;
a power supply; and
a frame comprising:
a main frame configured to mount to a front portion of a head of a user;
a first sub frame connected to a first end of the main frame and configured to be received by a first ear of the user, wherein the first sub frame comprises the controller;
a second sub frame configured to be detachably connected to a second end of the main frame and comprising the power supply unit;
a first connector provided at the second end of the main frame and electrically connected to the controller;
a second connector provided at the second sub frame and electrically connected to the power supply, wherein the second connector is configured to be connectable to the first connector when the second sub frame is detachably connected to the main frame,
wherein:
the power supply is electrically connected to the controller and power is supplied from the power supply to the controller when the first sub frame is connected to the first end of the main frame and the second sub frame is connected to the second end of the main frame; and
the main frame comprises:
an outer housing comprising a first opening located at the second end of the main frame and a channel opening along a first side of the outer housing, the first opening configured to accommodate the first connector inserted there through; and
an inner housing including an inner securing member configured to engage an outer securing member of the outer housing disposed at the channel opening to couple the inner housing to the outer housing.

2. The glasses-type terminal of claim 1, wherein the second sub frame is configured to be received by a second ear of the user.

3. The glasses-type terminal of claim 1, wherein:
the display is configured to display information to the user and disposed on the main frame; and
the power supply unit is configured to provide power to the display and the controller.

4. The glasses-type terminal of claim 1, wherein the first sub frame is detachably connected to the first end of the main frame, and
wherein the first sub frame and second sub frame are interchangeable such that the first sub frame and second sub frame are respectively detachably connected to the second end and first end of the main frame.

5. The glasses-type terminal of claim 1, wherein the main frame comprises
a cap coupled to the second end of the main frame to prevent separation of the first connector and the outer housing.

6. The glasses-type terminal of claim 5, wherein the cap includes:
an opening configured to accommodate the first connector inserted there through when the cap is coupled to the second end of the main frame; and
a securing cavity located on an outer side of the cap and configured to engage a corresponding protrusion located on an inner side of the second sub frame to frictionally secure the second sub frame to the main frame.

7. The glasses-type terminal of claim 6, wherein the second sub frame is rotatable with respect to the main frame to disengage the securing cavity from the corresponding protrusion.

8. The glasses-type terminal of claim 1, wherein the outer housing and inner housing are formed from different materials.

9. The glasses-type terminal of claim 1, further comprising a flexible printed circuit board electrically connected to the first connector and disposed between the outer housing and inner housing.

10. The glasses-type terminal of claim 1, further comprising an audio output unit configured to transfer sound to a user via bone conduction vibration.

11. The glasses-type terminal of claim 10, wherein the audio output unit is disposed at the first sub frame or the second sub frame.

12. The glasses-type terminal of claim 10, wherein the audio output unit is elastically supported by a bridge member and the audio output unit comprises a vibration transducer disposed at an opening of the first sub frame or second sub frame.

13. The glasses-type terminal of claim 12, wherein the bridge member comprises:
a base portion connected to the audio output unit;
a fixing portion coupled to an inner surface of the first sub frame or second sub frame; and
a connecting portion configured to connect the base portion and the fixing portion to each other, and configured to outwardly bias the audio output unit toward a user and restrict the vibration transducer from contacting the first sub frame or second sub frame.

14. The glass type terminal of claim 10, further comprising:
an operator configured to outwardly bias a vibration transducer of the audio output unit toward a user; and
a sensor configured to detect a first state and a second state of the audio output unit, wherein the audio output unit is in a fully outwardly biased position toward the user in the first state, and the audio output unit is depressed from the fully outwardly biased position by an opposing force applied to the audio output unit;
wherein the controller is configured to change an output of audio based on the first state or the second state detected via the sensor.

15. The glass type terminal of claim 14, wherein the controller is further configured to cause the audio output unit to stop outputting audio when the audio output module is changed to the first state.

16. The glass type terminal of claim 10, wherein the audio output module comprises an operator comprising an opening, the opening corresponding to a protrusion of a vibration transducer of the audio output unit to couple the operator to the vibration transducer.

17. The glass type terminal of claim 16, wherein:
the protrusion of the vibration transducer is male-threaded;
the audio output module further comprises an assembly member coupled to the male-threaded protrusion; and
the opening of the operator is configured to receive the assembly member.

18. The glass type terminal of claim 17, wherein the assembly member is formed to the operator by double injection molding or insert injection molding.

* * * * *